Dec. 19, 1933.  H. R. BRAND  1,940,071
FOOD PREPARING AND DELIVERING APPARATUS
Filed Aug. 14, 1928   8 Sheets-Sheet 1
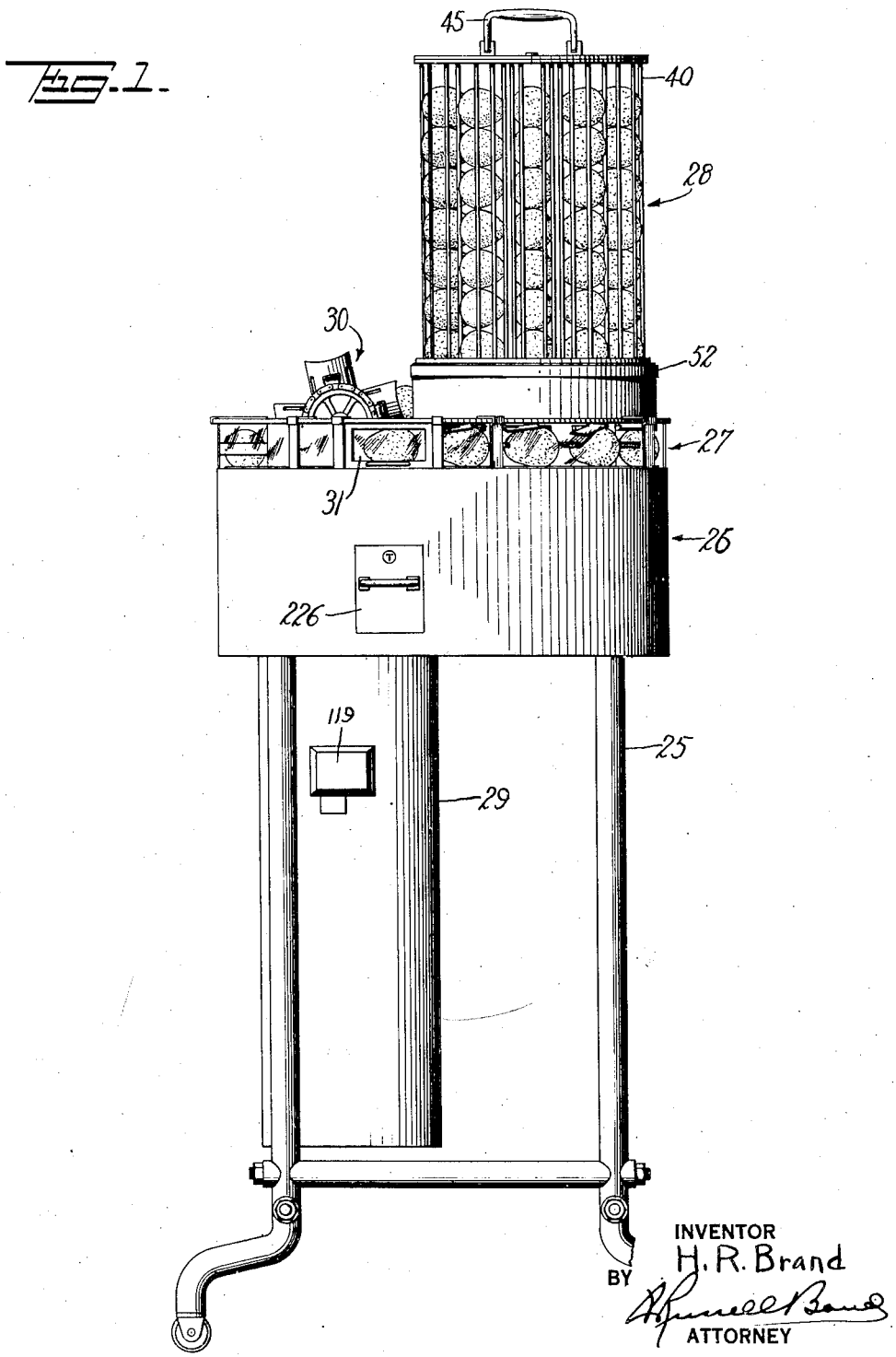

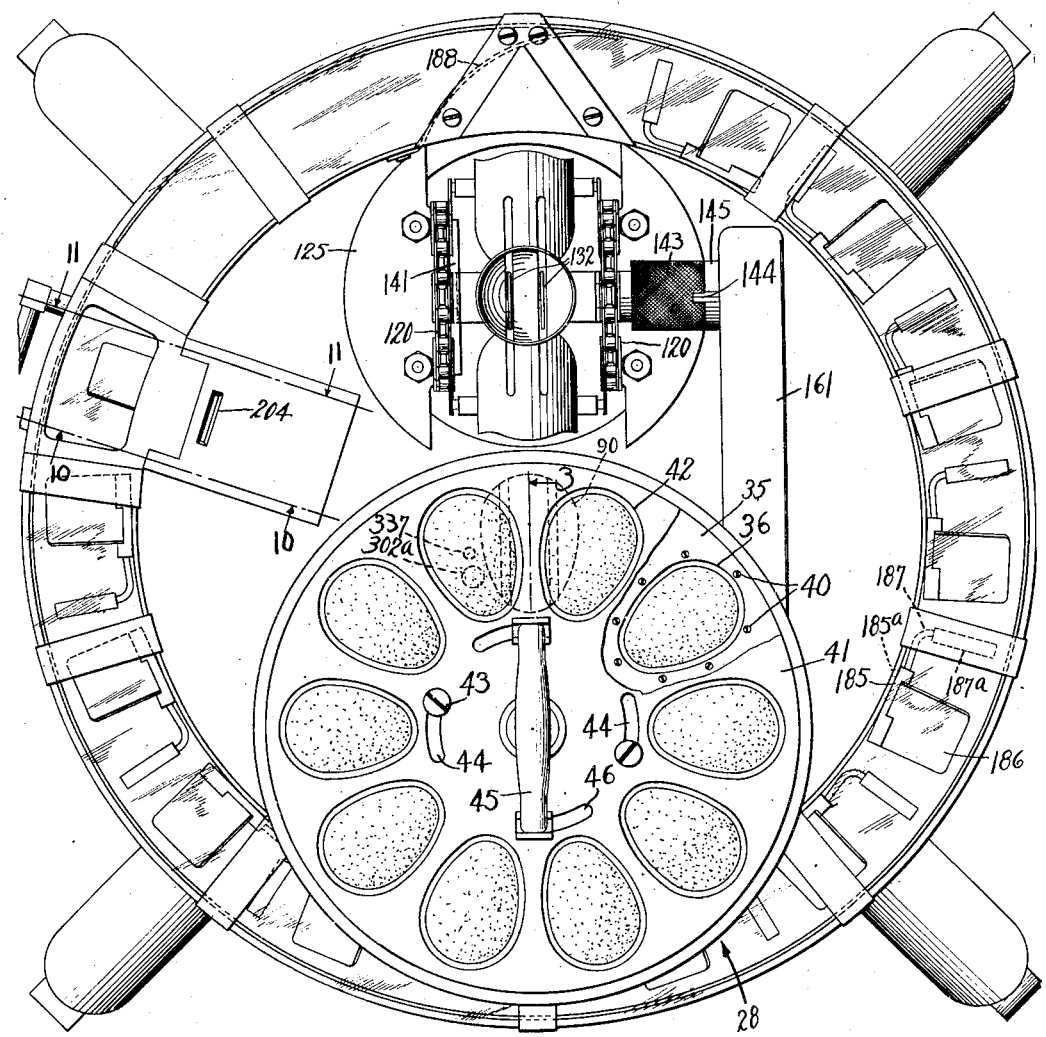

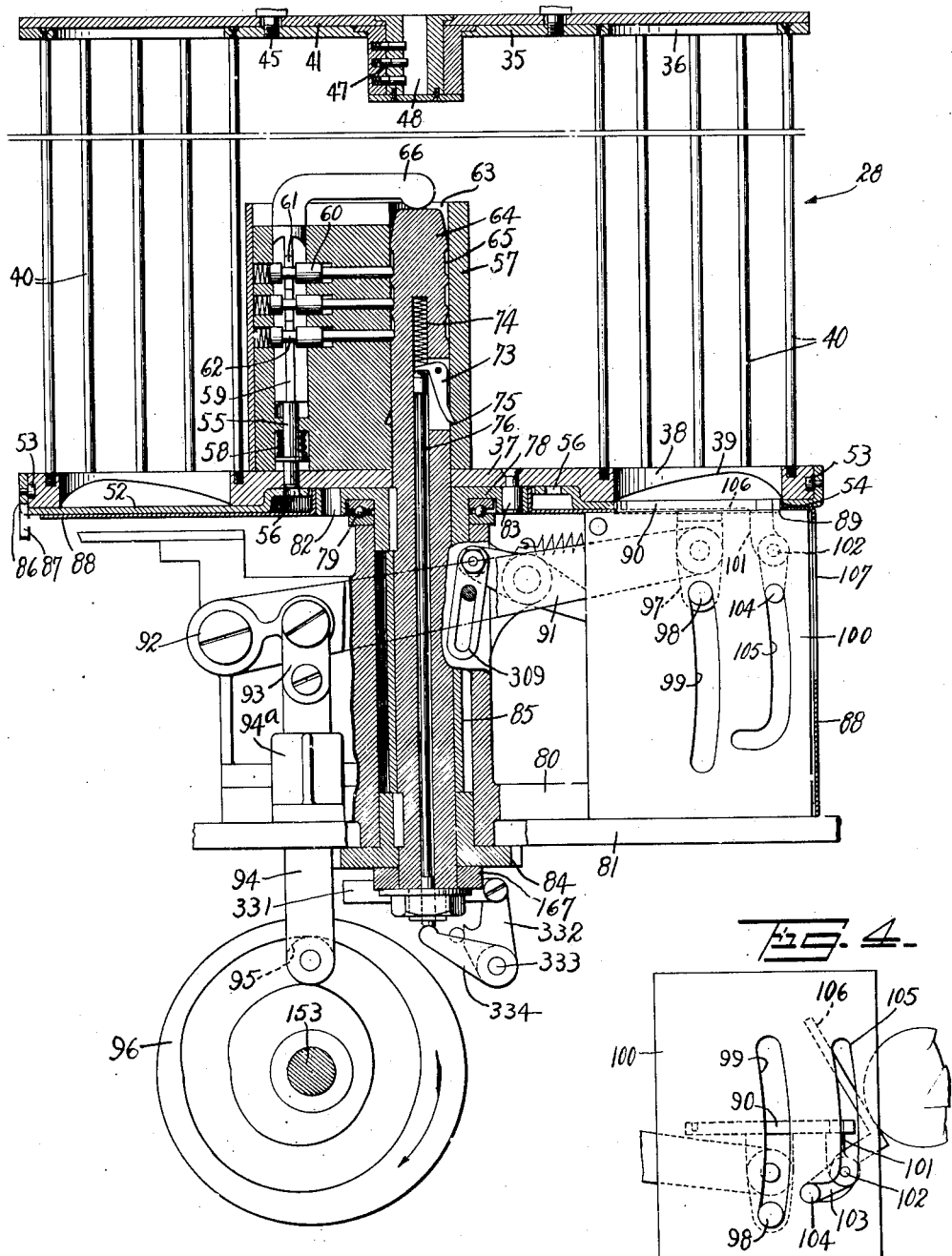

Dec. 19, 1933.   H. R. BRAND   1,940,071
FOOD PREPARING AND DELIVERING APPARATUS
Filed Aug. 14, 1928   8 Sheets-Sheet 4
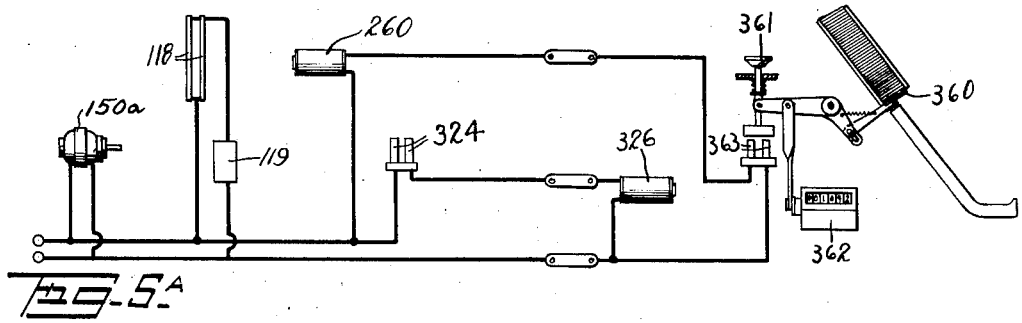
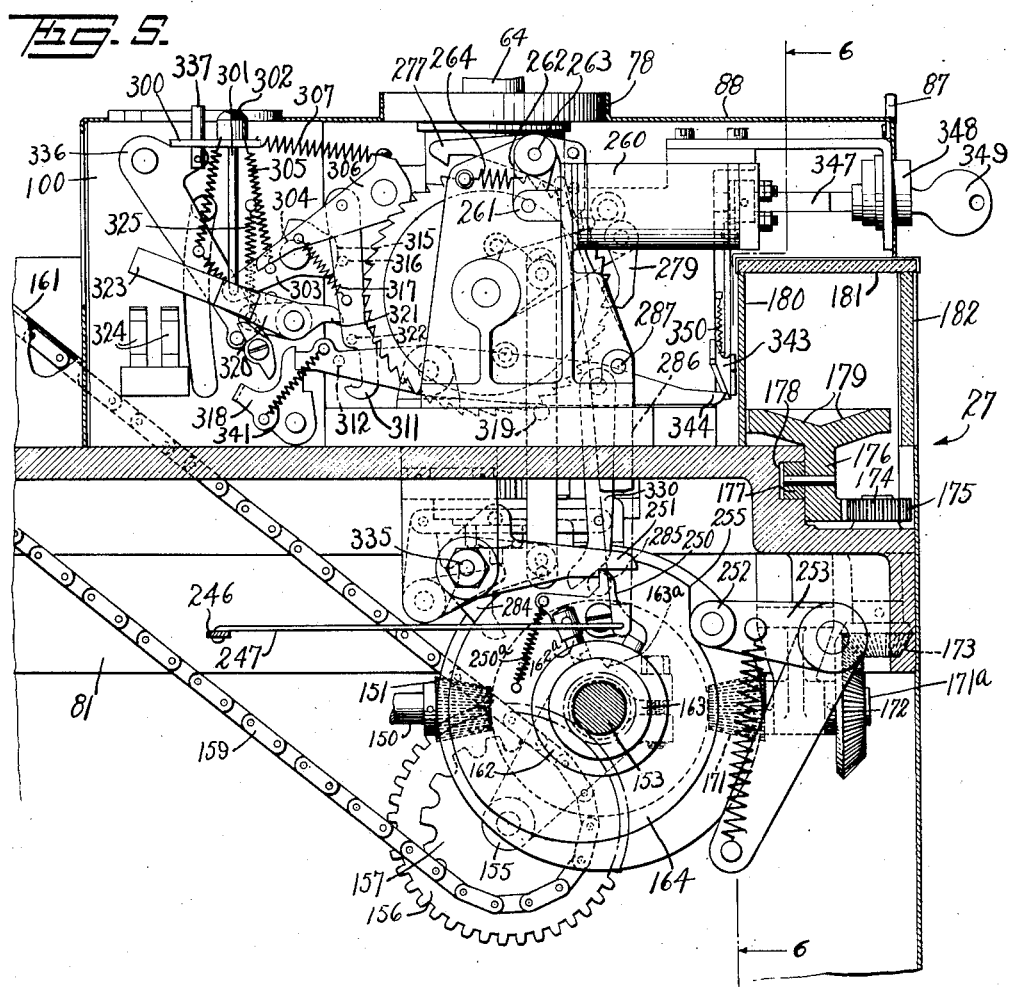
INVENTOR
H. R. Brand
BY
ATTORNEY

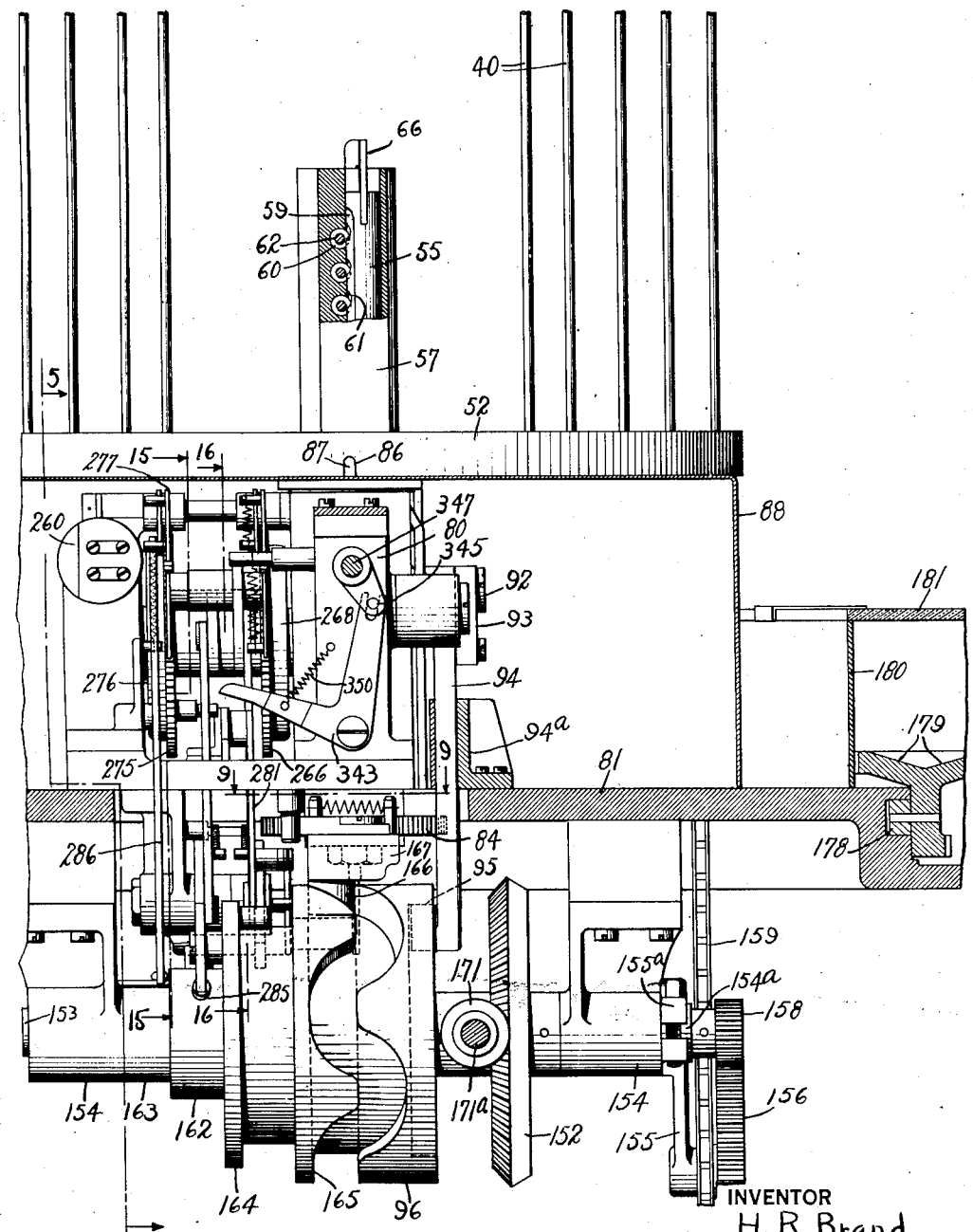

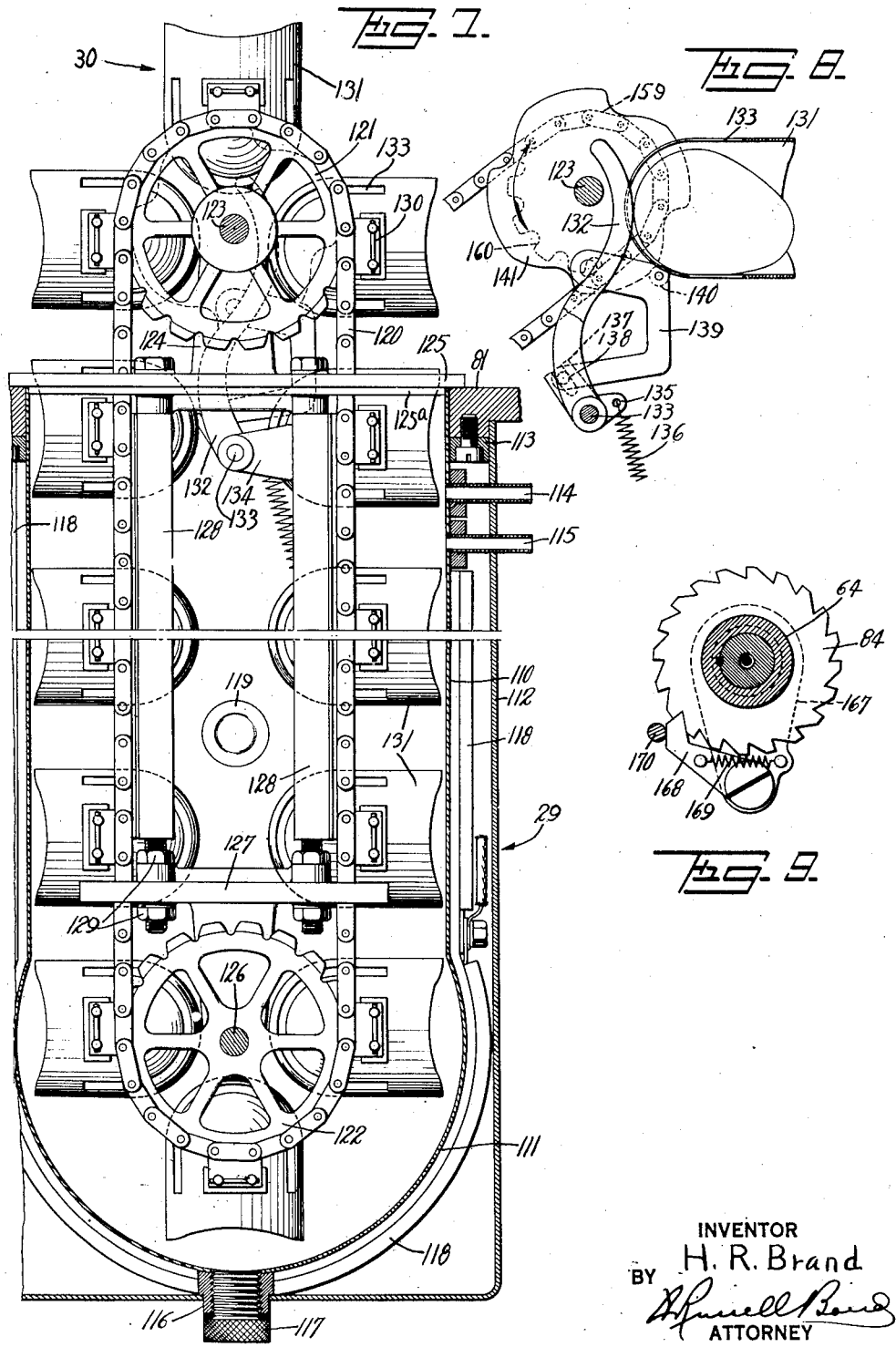

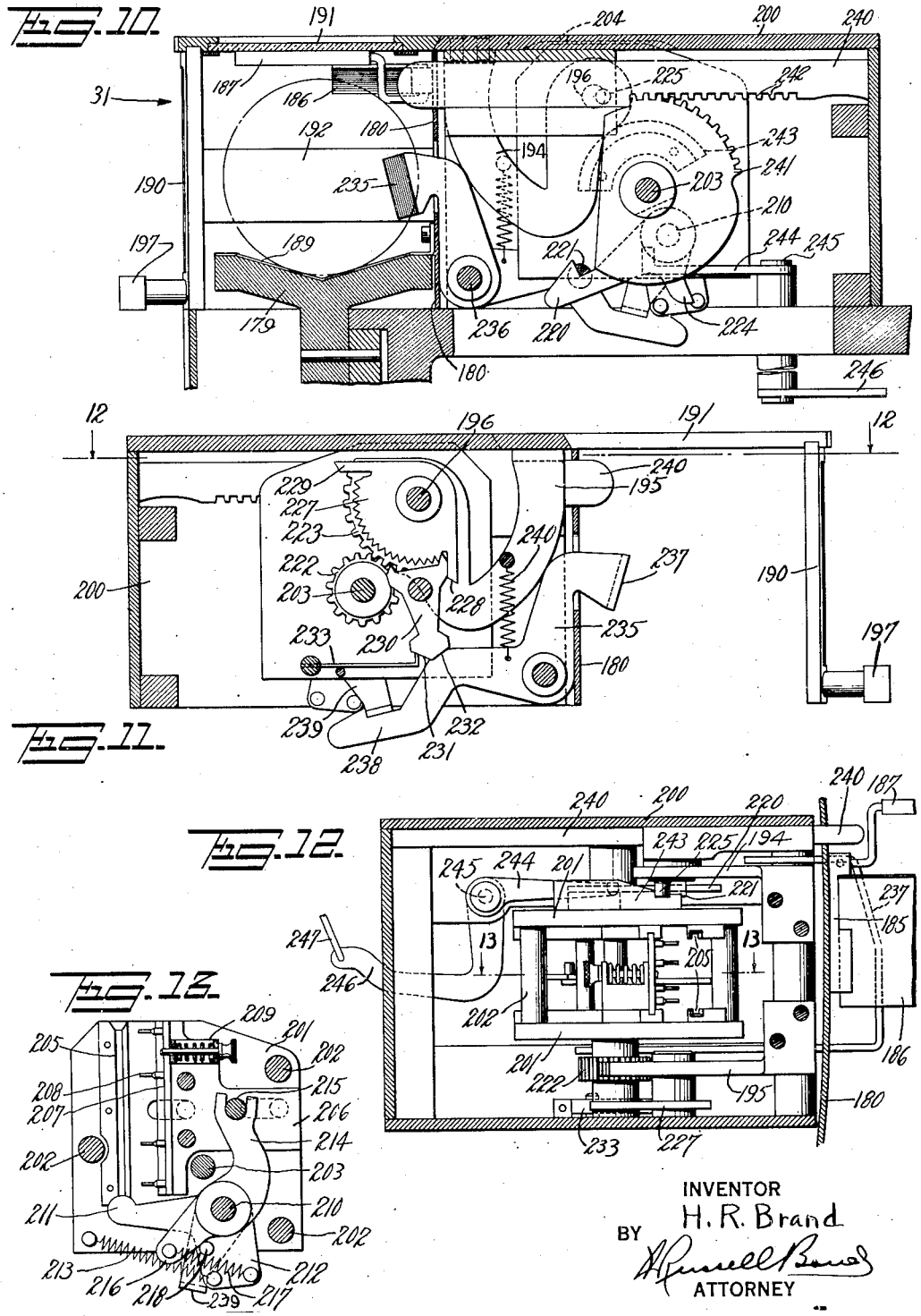

Dec. 19, 1933.  H. R. BRAND  1,940,071
FOOD PREPARING AND DELIVERING APPARATUS
Filed Aug. 14, 1928   8 Sheets-Sheet 8
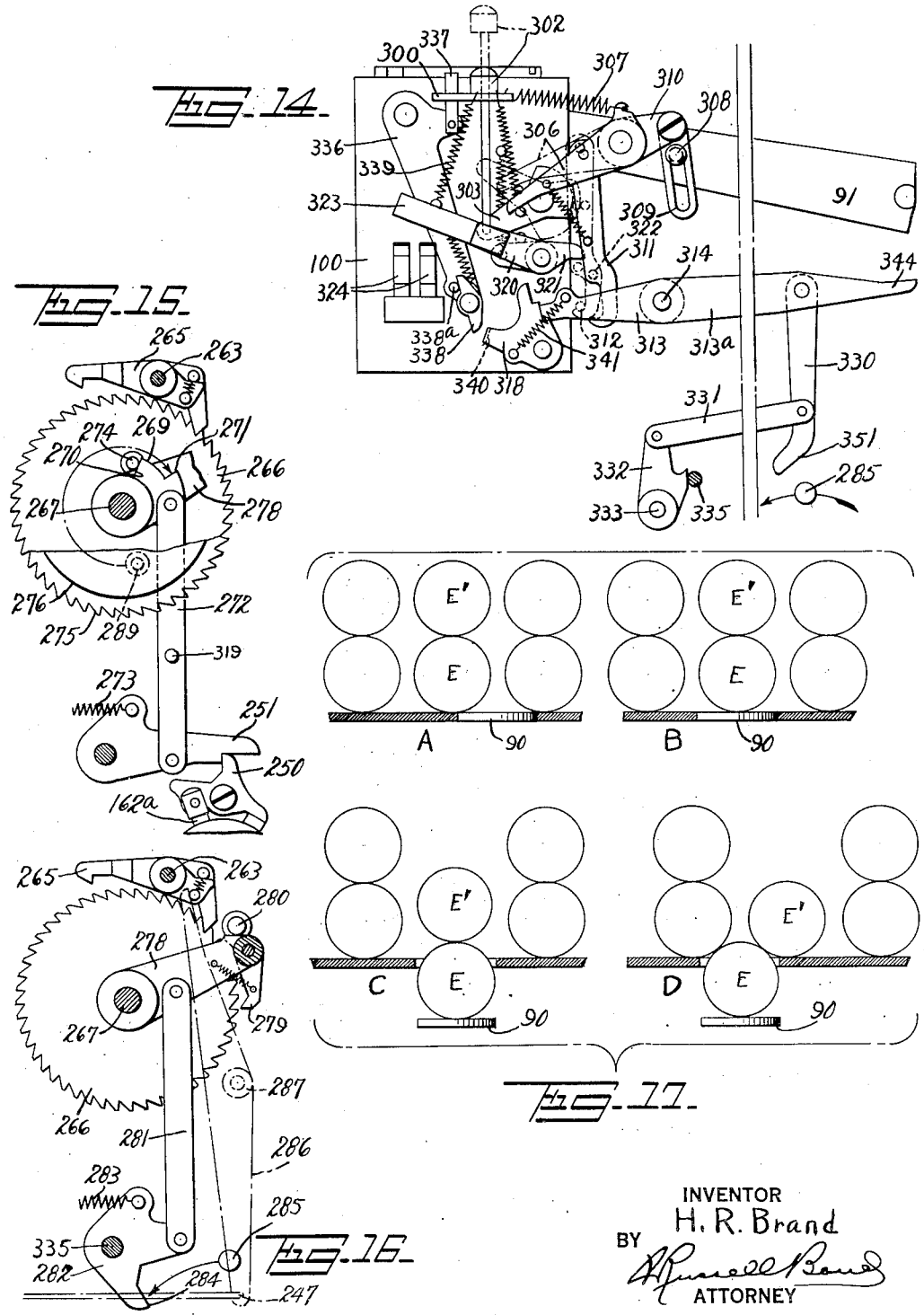
INVENTOR
H. R. Brand
BY
ATTORNEY Patented Dec. 19, 1933

1,940,071

UNITED STATES PATENT OFFICE 1,940,071

FOOD PREPARING AND DELIVERING APPARATUS

Harry Russell Brand, New York, N. Y.

Application August 14, 1928. Serial No. 299,582

23 Claims. (Cl. 194—4)

My invention relates to automatic food preparing apparatus and has for an object to provide a machine for automatically preparing food on order and delivering the food to a delivery station.

Broadly, the present invention relates to apparatus of the class disclosed in my copending application, Serial No. 268,659, filed April 9, 1928. More specifically the present invention relates to apparatus for boiling eggs but it will be understood that the apparatus can also be used for boiling other foods.

An object of the invention is to provide a magazine in which raw eggs (or other foods) are stored and from which the eggs are withdrawn on order by automatic means and thence passed through a boiler.

A further object is to provide for automatically conveying the eggs from the boiler to a locked delivery box and to provide token-controlled means for unlocking the box to permit of withdrawing the boiled eggs.

Another object of the invention is to provide a removable egg magazine which may be locked to prevent unauthorized withdrawal of eggs therefrom.

Another object is to provide an egg magazine with a discharge port which is automatically locked when the magazine is removed from the machine, but automatically unlocked when the magazine is positioned in the machine so as to permit withdrawal of eggs by the machine in response to order impulses from an order station.

Another object of the invention is to automatically lock the egg magazine on the machine when the magazine is placed thereon.

Another object of the invention is to automatically unlock the magazine from the machine when the eggs are exhausted from the magazine.

Another object is to provide key-operable means for unlocking the magazine from the machine and also to provide means to prevent unlocking of the magazine while an egg is being withdrawn therefrom.

Another object of the invention is to provide an accumulator for accumulating orders from the order station should the orders be received more rapidly than the eggs can be withdrawn from the magazine and also to provide means for preventing accumulation of more than a predetermined number of undelivered orders in the machine.

A still further object of the invention is to provide a novel means of withdrawing the eggs from the magazine so as to prevent cracking or breaking of the eggs.

With these objects in view and others which will appear hereinafter I shall now describe in detail a preferred embodiment of my invention in connection with the accompanying drawings in which, Fig. 1 is a side elevation of my improved egg boiling machine;

Fig. 2 is a top plan view of the same;

Fig. 3 is a view in section taken on the line 3—3 of Fig. 2;

Fig. 4 is a detail view of certain cam mechanism controlling the withdrawal of an egg from the egg magazine;

Fig. 5 is a fragmental view in vertical section taken substantially on the line 5—5 of Fig. 6, but with the egg magazine removed;

Fig. 5a is a diagram of electrical connections;

Fig. 6 is a fragmental view in vertical section taken substantially on the line 6—6 of Fig. 5 but with egg magazine in place;

Fig. 7 is a view in vertical section through the boiler of the machine;

Fig. 8 is a detail view of mechanism for discharging the eggs from the boiler to an annular conveyor which leads to a delivery box;

Fig. 9 is a detail view of certain ratchet mechanism for revolving the egg magazine;

Fig. 10 is a view in section taken on the line 10—10 of Fig. 2;

Fig. 11 is a view in section taken on the line 11—11 of Fig. 2;

Fig. 12 is a view in section taken on the line 12—12 of Fig. 11;

Fig. 13 is a view in section taken on the line 13—13 of Fig. 12;

Fig. 14 is a detail view of certain control mechanism used in a machine;

Fig. 15 is a fragmentary view in vertical section taken on the line 15—15 of Fig. 6;

Fig. 16 is a detail view in vertical section taken on the line 16—16 of Fig. 6; and Fig. 17 is a diagram illustrating successive steps in the withdrawal of an egg from the egg reservoir.

In general, my improved machine comprises a base 25 which supports a cylindrical body 26 containing certain actuating and control mechanism. Disposed about the body is an annular conveyor 27 and eccentrically disposed with respect to said conveyor is a support for an egg magazine 28. Projecting through and depending from the body 26 is a boiler 29 in which is located a bucket conveyor 30 adapted to deliver eggs from the magazine into the boiler and pass them through the boiler at a definite predetermined rate, such that, when they issue from the boiler, the eggs will be cooked to the desired degree. Upon issuing from the boiler, the egg is delivered to the annular conveyor 27 which carries the cooked eggs to a delivery box 31. The delivery box is normally locked and can be opened by operation of certain token controlled mechanism.

Egg magazine

The egg magazine consists of a cage in which a quantity of eggs are stored in a plurality of vertical columns, and the cage is rotated to bring the columns successively into alignment with certain withdrawal mechanism. The withdrawal to the boiler is preferably controlled from an order station which may be at any convenient location. The egg magazine 28, as best shown in Figs. 2 and 3, is formed with a top plate 35 having an annular series of ovate openings 36 therein, and with a base 37 also having a corresponding series of ovate openings 38 therein. An annular channel 39 is cut in the underface of the base, the purpose of which will be made clear hereinafter. Rods 40 connect the top plate 35 and the base 37 and are disposed along the margins of the openings 36 and 38 so that they serve not only to space the top plate and base but also as retainers for a column of eggs over each opening 38.

Seated on the top plate 35 is a locking lid 41 also formed with ovate openings 42 through which eggs may be introduced into the magazine. However, after a magazine has been loaded, the eggs are retained therein by turning the lid 41 with respect to the plate 35 so that the openings 42 in the lid are off-set with respect to the openings 36 in the plate 35. The lid is attached to the plate 35 by screws 43 which pass through arcuate slots 46 in the lid plate 41 and are screwed into the plate 35.

It is desirable to lock the lid in closed position so as to prevent any unauthorized person from gaining access to the eggs in the magazine. To this end, the lid 41 is provided at its center with a spring lock 47 which may be unlocked by inserting a suitable key in a key slot 48.

To prevent the eggs from dropping out through the openings 38 in the base, a bottom locking plate 52 is provided. This locking plate 52 is formed with an upturned annular flange which embraces the periphery of the disk 37 and mounted on this flange are rollers 53 which engage an annular groove formed in the periphery of the disk 37. The plate 52 is provided with a single ovate opening 54 at one side through which eggs may be withdrawn from the magazine. When the magazine is not in the machine, a pin 55 carried by the base 37 engages one of a number of openings 56 in the bottom plate 52, holding the latter at such angular disposition with respect to the plate 37 that the opening 54 is centered between two openings 38, thus preventing any eggs from dropping out of the magazine.

Means are provided for locking the bottom plate 52 in engagement with the base 37 when the magazine is not positioned in the machine, thus preventing anyone from turning the bottom plate to gain access to the eggs in the magazine. The pin 55 slides in a block 57 carried by the base 37 and is normally pressed downward by a spring 58. The upper part of the pin is enlarged and is formed with a longitudinally disposed flange or fin 59. A number of spring pressed locking pins 60 (see also Fig. 6) are mounted to slide transversely of the fin 59 and in normal position engage recesses 61 in the fin 59 to lock the pin 55 against movement. Each pin has a reduced portion or neck 62, such that when said necks are alined with the fin, the pin 55 can be moved. The block 57 has a vertical bore 63 extending therethrough and through the base plate 37 of the magazine and this bore is adapted to receive a shaft 64 vertically mounted in the machine. The pins 60 project into the bore 63 and the shaft 64 serves as a key to depress the pins 60 sufficiently to unlock the pin 55. The upper end of the shaft is tapered and is formed with annular grooves 65 adapted to receive the ends of the pins 60, the depth of the several grooves being gaged to the length of the pins 60, so that all the necks 62 will be alined with the fin 59 when the magazine is in place on the shaft 64. The upper end of the pin 55 has a lateral extension 66 terminating over the bore 63 in such position that when the magazine is mounted on the shaft 64 and the pin 55 is unlocked, the latter will be lifted clear of the opening 56 by engagement of the extension 66 with the top of the shaft. This permits relative rotation of the magazine with respect to the bottom locking plate.

When the magazine is positioned on the shaft 64, it is locked thereon by a latch 73. The latter is mounted in a recess in the shaft 64 and is normally pressed by a spring 74 into engagement with an annular notch 75 in the bore 63. A rod 76 runs axially through the shaft 64 and engages the latch 73, and mechanism is provided, which will be described hereinafter, for lifting the rod 76 to move the latch 73 out of engagement with the notch 75.

Keyed to the shaft 64 is a flange head 78 which is supported by ball bearings 79 upon a bracket 80 secured to a base plate 81 in the body of the machine. The shaft 64 extends through the bracket 80 and the base plate 81 and has, at its lower end, a ratchet wheel 84 keyed thereon. The sleeve 85 fitted upon the shaft 64 serves as a spacer between the flange member 78 and the ratchet wheel 84. In the flange head are a number of openings 82 adapted to be engaged by a pin 83 depending from the egg magazine and thereby keying the magazine to the shaft 64.

When the magazine is mounted in the machine, it is turned so that a notch 86 in the plate 52 will receive a lug 87 carried by a fixed casing 88 (see also Fig. 6). This brings the opening 54 into alinement with certain egg withdrawing mechanism which will now be described.

Egg withdrawing mechanism

The casing 88 above referred to, is secured to the base plate 81 and houses the egg withdrawing mechanism as well as certain control mechanisms which will be described hereinafter. This casing is formed with an opening in which the flange member 78 is freely fitted and also with a second opening 89 alined with the opening 54 and through which the eggs are withdrawn one at a time from the magazine.

The egg withdrawing mechanism (see also Fig. 4) includes a platform 90 adapted to a project through the openings 89 and 54 to receive an egg from the magazine when the latter is turned so that one of the openings 38 is alined with the platform. The platform 90 is pivotally supported on an arm 91 fulcrumed at 92 on an extension of the bracket 80. A link 93 connects the arm 92 to a rod 94 vertically slideable in a guide 94a attached to the base plate 81. The lower end of the bar 94 carries a roller 95 which engages a cam groove in an end face of a cam 96.

The platform 90 has a depending lug 97 which carries a pin 98 and the latter is adapted to slide in an arcuate slot 99 formed in a cam plate 100. The slot is of such character as to hold the platform 90 in horizontal position while it is moved up and down by the cam 96.

Depending from the platform 90 is a second lug 101 which provides a bearing for a shaft 102. A crank arm 103 is secured to the shaft and carries a pin 104 which engages a second cam groove 105 in the plate 100. Secured to the shaft are a pair of fingers 106, which, in the normal position of the platform shown in Fig. 3, lie in slots in the face of the platform, but which, when the platform is lowered, will swing upward and outward by engagement of pin 104 with slot 105 (as shown in Fig. 4) forcing the egg off the platform and into the bucket conveyor 30 which runs through the boiler 29.

*Boiler and bucket conveyor*

The boiler 29 of my machine comprises a cylindrical shell 110 (Fig. 7) which terminates in a spherical bottom portion 111 and surrounding the shell is a jacket or casing 112. The shell and the casing are secured to a spacer ring 113 near the top of the boiler and this ring is secured to the underside of the base plate 81. Water is admitted into the shell from a suitable source through a pipe 114 and the level of water in the boiler is maintained at a predetermined height by an overflow pipe 115. A drain pipe 116 leads from the bottom of the shell through the jacket 112 and is normally closed by a plug 117. The water in the boiler is heated by an electric resistance element 118 which surrounds the shell 110 and a thermostat 119 insures a flow of just sufficient current to maintain the water in the boiler at boiling temperature.

Within the boiler shell is the bucket conveyor which carries the eggs down into the boiling water and out again at a predetermined rate to subject the eggs to the requisite interval of boiling, after which they are automatically ejected from the bucket conveyor into the annular conveyor 27.

The bucket conveyor comprises two endless chains 120 (see also Fig. 2) which run over a pair of upper sprocket wheels 121 and a pair of lower sprocket wheels 122. The sprocket wheels 121 are secured to a drive shaft 123 which is journaled in a bracket 124. The latter is provided with a pair of base flanges 125 which rest on the base plate 81 and have shoulders 125a which fit snugly into the mouth of the boiler shell 110. The lower sprocket wheels 122 are secured to a shaft 126 journaled in a bracket 127. The latter is secured to the bracket 124 by means of vertical rods 128 and the bracket 127 may be adjusted on said rods by means of nuts 129 to vary the tension on the chains 120.

Secured to the links of the chains 120 at suitable intervals by means of fastening devices 130 are buckets or cups which are open at their outer ends to receive the eggs. The cups lie normal to the chain and hence occupy a horizontal position except as they swing around with the chain at the top and bottom of the conveyor. In order to provide clearance for these cups at the bottom of the conveyor, the spherical portion 111 is made of slightly larger diameter than the cylindrical portion 110 of the boiler shell.

When an egg is ejected by the fingers 106 as described above, it is forced into a cup 131 and is carried by the latter down into the boiler. While passing through the boiler, the mouth of the cup is closed by the boiler shell so that the egg cannot drop out. Obviously, the position of the cup is reversed by its revolution about the shaft 126 so that it faces toward the outside of the machine as it issues from the boiler.

As each cup emerges from the boiler, its content is ejected by a pair of fingers 132 which pass through slots 133 formed in the rear-end wall of the cup. The fingers 132 (Fig. 8) are secured to a shaft 133 which is journaled in a fixed arm 134 carried by the rods 128. The shaft 132 also has secured thereto a crank arm 135 which is urged downward by a spring 136 tending to force the fingers 132 outward. A second crank arm 137 secured to the shaft 133, is slotted to receive a pin 138 on the end of a U-shaped arm 139. The latter is pivoted to the bracket 124 and carries a roller 140 adapted to bear against a cam 141 secured to the shaft 123. The form of the cam is such that as each cup reaches the discharge position, the fingers 132 will be released, permitting the spring 136 to swing them outward through the slots 133. But, immediately after an egg has been ejected, the fingers are withdrawn by the cam 141 acting on the roller 140.

It will be observed that the conveyor is so arranged that it may be lifted out bodily from the boiler shell whenever desired, as it is not secured to the shell in any way but merely fits into the shell and rests upon the base plate 81 to which the shell is secured. However, before the conveyor may be lifted out of the boiler, the shaft 123 must be disconnected from the mechanism which drives it. To this end, the shaft 123 (see Fig. 2), is provided with a sleeve 143 slideable lengthwise thereon and preferably held by a spring latch (not shown), either in the extended position illustrated or in retracted position. The sleeve is slotted to engage lugs 144 on a drive shaft 145. Thus, by retracting the sleeve 143 to clear the lugs 144, the conveyor will be disconnected from its driving mechanism and may be lifted bodily out of the boiler.

*Driving mechanism*

The driving mechanism for turning the egg magazine and operating the bucket conveyor is best shown in Figs. 5 and 6. A drive shaft 150 is driven through suitable reducing gears by a motor 150a, Fig. 5a or other suitable power source. The shaft 150 carries a bevel pinion 151 which engages a bevel gear 152 secured to a cam shaft 153. This cam shaft is journaled in brackets 154 secured to the underface of the base plate 81. Clamped upon a bushing 154a fixed in one of the brackets 154, is an arm 155 which provides a bearing for a gear wheel 156 and a sprocket wheel 157. The gear wheel 156 engages a pinion 158 fixed upon the end of the shaft 153. The sprocket wheel 157 is secured to the gear 156 and carries one end of a chain belt 159, the opposite end of which passes about a sprocket wheel 160 (Fig. 8) on the shaft 145 (Fig. 2). The chain 159 passes through an opening in the base plate 81 and the part which lies above the base plate is preferably encased in a guard 161. Thus, power is transmitted to the boiler conveyor at a greatly reduced speed from the power shaft 150. By means of the clamp 155a, the arm 155 may be adjusted to take up slack in the chain belt 159.

The bucket conveyor is driven continuously but the egg magazine is driven intermittently and only in response to orders from an order station. For this reason, the mechanism which drives the egg magazine is connected to power through a clutch. As shown in Figs. 5 and 6, a clutch collar 162 is mounted to turn freely with respect to the cam shaft 153 and a clutch pin 162a slidable radially in the collar is adapted to engage a notch 163a in a sleeve 163 fixed upon the cam shaft. The collar 162 is an integral part of the cam 96 and an associated cam 164. The cylindrical face of the cam 96 is formed with a cam groove 165 which is engaged by a roller 166 carried by an arm 167 (Fig. 9). The latter is mounted to turn freely on the lower end of the shaft 64. Pivotally secured to the arm 167 is a pawl 168 which is normally pressed by a spring 169 into engagement with the teeth of the ratchet wheel 84. Thus, as the roller 166 is moved back and forth by engagement with the cam groove 165, the ratchet wheel 84 will be fed clockwise, as viewed in Fig. 9, through an angle of one tooth spacing at each throw of the roller 166. A pin 170 is adapted to engage the pawl 168 at the end of each throw to prevent overthrow of the ratchet wheel 84 and also to lock the magazine in place so that it cannot be turned by hand, but must be turned only by the cam 96.

There are twice as many teeth on the ratchet wheel 84 as there are openings 38 in the base plate 37 of the egg magazine. At each rotation of the cam 96, the ratchet wheel is advanced twice. The first advance turns the magazine so that an opening 38 (Fig. 3) is alined with the opening 54, permitting an egg to be withdrawn by a preliminary lowering of the platform 90 and at the next stop of the magazine, the opening 38 is moved out of registry with the opening 54. During the second step, the egg in the platform will not have been carried below the plane of the base plate 37, but clearance is provided for the egg by the recess 39.

Meshing with the bevel gear 152 on the opposite side from the drive shaft 150 is a bevel pinion 171 (Fig. 5) and the latter is secured upon a stub shaft 171a which has fixed thereon a bevel gear 172. A bevel pinion 173 meshes with the gear 172 and is secured to a vertical shaft 174 which passes up through the base plate 81 and has a spur pinion 175 secured upon its upper end. The pinion 175 engages the teeth of an annular rack 176 which is provided with rollers 177 adapted to ride in a groove 178 formed in the base plate 81.

*The annular conveyor and the delivery box*

The rack 176 forms part of the annular conveyor 27 and is provided with oppositely inclined lateral flanges 179 which together form a shallow annular trough. A casing covers the annular conveyor and consists of an inner annular wall 180, a glass panelled top wall 181 and an outer glass panelled wall 182. This annular conveyor also runs continuously and is not dependent for its operation upon orders received from the order station. Eggs ejected from the bucket conveyor by the fingers 132 enter upon the annular conveyor and are carried thereby around the machine to the delivery box 31.

The eggs are spaced apart and kept from striking each other on the conveyor by suitable spacer gates which are shown in Figs. 1, 2, 10 and 12. Each gate consists of a lever 185 fulcrumed at 185a and which, at one end, carries a plate 186 slightly inclined with respect to the plane of the conveyor, while, at the other end, the lever is formed with a stem 187 which is curved radially outward and bears a sleeve 187a of rubber or other suitable soft material. An egg, as it is moved forward by the horizontal conveyor, engages the plate 186, lifting the latter and forcing the stem 187 down back of it so that it lies in the path of a succeeding egg. The plate 186 is heavier than the stem 187 and hence after an egg has passed out from under a plate 186, the stem 187 will swing upward permitting a succeeding egg to enter.

By this means, the eggs are kept at a uniform distance apart, thus preventing them from piling up and breaking and one egg cannot enter a spacer gate until the preceding egg has cleared said gate.

As shown in Fig. 2, when an egg is ejected from a cup 131, it strikes a curved deflector plate 188 and is guided thereby in the proper direction on the horizontal conveyor so that there is no tendency for it to become jammed in the conveyor. As each egg reaches the delivery box, it rides upon a thin plate 189 which is secured to the wall 180 and lies against the trough shaped bottom of the horizontal conveyor. Thus, after an egg has entered the box 31, it is relieved of the frictional drag of the conveyor, and there is no danger of its being tumbled over and broken.

The delivery box, as shown in Figs. 2, 10 and 11 consists of a portion of the annular conveyor space, bounded at the rear by the wall 180 and at the top and forward side by walls 190 and 191 while a bar 192 at the far end of the box serves as a safety stop for eggs that are fed into the box. Immediately to the rear of the delivery box is a casing 200 in which is located the token receiver and mechanism controlled thereby. The walls 190 and 191 of the delivery box are fixed together and constitute the door of the delivery box. The wall 191 has secured thereto a pair of hinge members 194 and 195 which are journaled upon a pair of studs 196 in the side walls of the casing 200. The walls 190 and 191 are preferably provided with glass panels so that the contents of the box may be inspected. The wall 190 is provided with a handle 197 by which the door of the delivery box may be swung open on the hinge studs 196 as an axis when unlocked by the insertion of a proper token in the token receiver.

*The token receiver*

The token receiver is similar to that described in said copending application Serial No. 268,659. As shown in Figs. 12 and 13, it comprises a pair of side plates 201 connected in spaced relation by transverse rods 202. The plates 201 are secured to a transverse shaft 203 whereby they may be rotated after receiving a token to discharge the token into a suitable receptacle. A slot 204 is provided in the top wall of the casing 200 and in alinement with said slot are grooves 205 formed in the side plates 201. Mounted to slide transversely within the token receiver between the plates 201, is a slide frame 206 which has pin and slot connection with the side plates 201. At the forward end of the frame 206 is a vertical plate 207 which is provided with pins 208 adapted to feel out a token introduced into the slot 205.

The token consists of a plate of metal provided with perforations therein arranged in a certain predetermined combination of locations and the pins 208 are arranged in the same combination as the perforations in the token so that if a proper token is inserted in the grooves 205, the pins will enter the perforations and the frame 206 will slide forward to its full extent; otherwise, one or more of the pins will strike the solid portion of the token and limit the extent to which the slide 206 may be moved. A spring latch 209 is provided for securing the pin plate 207 to the frame 206 so that when desired, the pin plate may be replaced with another plate to change the combination of pins for a different form of token.

When a token is inserted into the grooves 205, it operates to move the slide 206 forward through a bellcrank lever which turns freely on a transverse shaft 210. One arm 211 of the bellcrank lever lies in the path of the token introduced into the receiver, while the other arm 212 of the lever is connected by a spring 213 to one of the side plates 201. Fixed upon the shaft 210 is a second lever, one arm 214 of which is forked to embrace a pin 215 on the slide frame 206. The other arm 216 of said second lever is connected by a spring 217 to the arm 212 of the bellcrank lever and is urged by the spring 217 against a stop pin 218 on the arm 212. When a token is inserted in the slot 205 and pressed therein, it depresses the arm 211 and due to the spring connection between said arm and the arm 216, the slide 206 is moved forward or to the left as viewed in Fig. 13. If the token is a proper one, the pins will enter the openings in the token and lock the same in place. If, on the other hand, an improper token is inserted in the receiver, the slide 206 is prevented from moving into engaging position and depression of the arm 211 results merely in extending the spring 217. Hence the token, as soon as it is released, will be thrown out of the slot by the springs 217 and 213.

Secured upon the shaft 210 is a latch arm 220 (Fig. 10) which normally engages a pin 221 projecting from a side wall of the casing 200. When the slide 206 is moved into locking engagement with a token, the arm 220 is swung clear of the pin 221 and will be held in such position by engagement of the token with the pins 208. Secured upon the shaft 203 is a pinion 222 (Figs. 11 and 12), and the hinge arm 195 is formed with a toothed sector 223 which meshes with said pinion. Normally, therefore, the door of the token receiver is locked in closed position by the intermeshing of the sector 223 and pinion 222 and engagement of the latch 220 with the pin 221. When, however, a proper token is inserted in the receiver, the token receiver is unlatched and thereupon the door of the delivery box may be swung open on its hinges.

When the door of the delivery box is opened, the token receiver is turned by engagement of the sector with the pinion because the token receiver is affixed upon the shaft 203. The latch arm 220 has a laterally projecting lug 224 which is adapted to engage a pin 225 when the token receiver has been turned through an angle of 180 degrees. The pin 225 projects from one of the walls of the casing 200 and when the lug 224 strikes said pin, the shaft 210 is rotated sufficiently to cause withdrawal of the pins 208 from the token, whereupon the token will be ejected from the receiver which is now in inverted position, by the spring 213 acting upon the arm 211. The ejected token drops into a drawer 226 (Fig. 1) fitted in the body of the machine and provided with a suitable lock to prevent unauthorized access thereto.

Means are provided to insure complete opening of the door of the delivery box before it can be moved to closed position and also complete closure before it can be opened again. To this end, adjacent the arm 195 and fixed thereto, is a ratchet toothed sector 227 (Fig. 11) which is provided at each end with extending ears 228 and 229 respectively. A double toothed pawl 230 is pivotally mounted on the casing 200 in such position that one or the other of the teeth of the pawl will engage the teeth of the sector 227. The pawl 230 is provided with a depending extension terminating in two sloping surfaces 231 and 232 and a leaf spring 233 is adapted to engage one or the other of said surfaces. When the parts are in the position shown in Fig. 11, it will be evident that the door may be swung open and the pawl 230 will ratchet over the teeth of the sector 227, but will prevent movement in the opposite direction. Thus, once the door has been opened, it cannot be closed until the opening has been completed. At the end of the opening stroke, the ear 229 will engage the idle tooth of the pawl 230 and swing the pawl on its pivot so that said idle tooth will now actively engage the teeth of the sector and the other tooth will now become idle. The spring 233 will hold the pawl in this position by engaging the surface 232 and in this position the pawl will be held until a full stroke has been completed in the closing direction when the ear 228 will swing the pawl back to the position shown in Fig. 11. By this simple means, a full stroke, either in the opening or closing direction is assured. It is necessary to open the door completely so as to swing the token receiver far enough to cause the ejection of the token into the token drawer 226.

Means are provided for preventing operation of the token receiver if there is no egg in the delivery box. To this end, a feeler 235 is provided which projects through the wall 180 into the delivery box. This feeler consists of a substantially U-shaped lever which is secured to a shaft 236 within the casing 200. The part 237, connecting the two legs of the U-shaped lever, projects through an opening in the wall 180 and is outwardly inclined (as indicated in Fig. 12), so that when an egg is introduced into the delivery box, it will depress the portion 237 of the lever 235, causing the latter to turn the shaft 236. One of the legs of the lever 235 is provided with a rearward extension 238 (Fig. 11) which normally engages an arm 239 secured to the shaft 210. A light spring 240 serves to hold the arm 238 in latching engagement with the arm 239 and thus locks the shaft 210 against turning so that a token cannot depress the arm 211 and actuate the token receiver. When, however, an egg is introduced into the delivery box, it will force the plate 237 rearward, releasing the arm 239 from engagement with the latch 238 and permitting operation of the token receiver.

It is essential to prevent the entrance of a second egg into the delivery box before the delivery box has been closed, as, otherwise, a person might get more than one egg for his token. As explained above, spacer gates are used to hold the eggs at a definite spacing and to prevent one egg from advancing before the space immediately ahead has been cleared. Such a spacing gate is provided in the delivery box, but obviously, when an egg has been withdrawn from the delivery box, the spacer gate would open and admit another egg, were not special means provided for locking the spacer gate closed. The special means referred to consists of a bar 240 which is adapted to slide lengthwise of the casing 200 and through an opening in the wall 180 into the delivery box. Secured upon the shaft 203 is a mutilated gear 241 which meshes with a rack 242 formed on the bar 240. Thus, when the door of the delivery box is opened and the shaft 203 is rotated by such opening, the gear 241 by engaging rack 242, will slide the bar 240 into the delivery box and over the stem 187 of the spacer gate 187, thus maintaining the stem in lowered or locking position until the door of the delivery box is closed.

As will be explained presently, means are provided for controlling the operation of the machine so that no more than a predetermined number of undelivered orders may accumulate therein. To this end, certain control mechanism is actuated each time the delivery box is opened to remove an egg therefrom. A cam 243 is fixed upon one of the slide walls 201 and is adapted to engage an arm 244 mounted on a vertical stud 245. Secured to said stud is an arm 246 and the latter is connected by a link 247 to the control mechanism previously mentioned.

*Clutch control mechanism*

The clutch pin 162a (Fig. 5) is pivotally connected to one arm of a clutch lever 250 fulcrumed on the face of the cam 164. Normally, the clutch pin is held out of engagement with the notch 163a by a dog 251 engaging the lever 250. When the dog is lifted clear of said lever, a spring 250a acting on the lever presses the pin inward so that it will engage the notch 163a as soon as the latter is in registry therewith. The clutch will remain in engagement until the lever 250 strikes the dog 251 and is thereby operated to withdraw the clutch pin from the notch. A roller 252 carried by a spring pressed arm 253 bears against the periphery of the cam 164 and by pressing against an inclined step 255 on the cam causes the latter to override the cam shaft just as the clutch reaches the disengaging position, thereby facilitating withdrawal of the clutch pin.

When an order is received at the cashier's desk or other ordering station, a key is depressed and a token is issued to the customer and simultaneously an electric impulse is transmitted to a solenoid 260. The armature 261 of this solenoid is pivotally connected to a crank arm 262 fixed upon a shaft 263 so that when the solenoid is energized, the crank arm is drawn to the right as viewed in Fig. 5 against the pull of a spring 264. Fixed upon the shaft 263 is an escapement 265 controlling a ratchet wheel 266 (see Fig. 15). This ratchet wheel is mounted to turn on a shaft 267 and is normally urged in counter-clockwise direction, as viewed in Fig. 15 by a coil spring fitted in a drum 268 (Fig. 6). Mounted to turn freely on the shaft 267 is a sector shaped arm 269 formed with two shoulders 270 and 271. A link 272 connects the arm 269 to the dog 251. A spring 273 tends to draw the dog 251 out of engagement with the clutch lever 250 but is normally prevented from doing so by a pin 274 on the wheel 266 which engages the shoulder 270 of the arm 269. When, however, the solenoid 260 is operated to permit the escapement wheel 266 to move under impulse of its coil spring in counter-clockwise direction, as viewed in Fig. 15, the pin 274 is withdrawn from engagement with the shoulder 270 permitting the spring 273 to raise the dog 251 and thus release the clutch lever 250.

Mounted to turn freely on the shaft 267 is a second ratchet wheel 275 which also is urged in counter-clockwise direction by a spiral spring housed in a drum 276 (Fig. 5). An escapement 277, similar to the escapement 265 but freely mounted on the shaft 263 controls the ratchet wheel 275. Mounted freely on the shaft 267 is an arm 278 (Fig. 16) which carries a pair of pawls 279 adapted to engage the teeth of the ratchet wheels 266 and 275 respectively. Normally, the pawls are held out of engagement with said teeth by a pin 280. A link is connected at one end to the arm 278, and at the other to one arm of a three armed lever 282. A spring 283 connected to another arm of said lever normally raises the arm 278 to the position shown in Fig. 16 with the pawls 278 held clear of the ratchet wheels 266 and 275. The third arm 284 of the lever 282 projects into the path of a pin 285 carried by the cam 164. Thus, as soon as the clutch is engaged upon withdrawal of the dog 251 from the clutch lever 250, the driven elements of the clutch will be turned in counter-clockwise direction as viewed in Fig. 5 and the pin 285 will engage the arm 284, drawing the arm 278 downward and thereby turning the wheels 275 and 266 clockwise as viewed in Figs. 15 and 16. Thus, by this arrangement, as each order impulse is transmitted to the machine, the wheel 266 will move counter-clockwise and at each operation of the clutch in response to said order, it will move clockwise. At the same time, the wheel 275 is moved clockwise with the wheel 266 but its escapement 277 is operated to permit the wheel to move counter-clockwise at each operation of the delivery box door.

As explained above, each operation of the delivery box results in exerting a pull on the rod 247. This rod is connected to a lever 286 fulcrumed on a pin 287 and connected at its upper end with the escapement 277 (Fig. 5). Hence, operation of the delivery box door will swing the escapement 277 sufficiently to permit the ratchet wheel 275 to move counter-clockwise through one tooth spacing. The purpose of this is to prevent too great an accumulation of undelivered orders in the machine; for on the wheel 275 is a pin 289 (Fig. 15) which is adapted to engage the shoulder 271 when it has been moved in clockwise direction through a predetermined angle, thereby locking the arm 269 against movement and preventing the dog 251 from releasing the clutch lever 250.

Means are provided for preventing operation of the clutch when there are no eggs in the egg magazine. Fixed upon the plate 100 (Figs. 5 and 14) is a bracket 300 which serves as a guide for a vertically sliding rod 301 provided with a feeler button 302 at its upper end. The lower end of the rod 302 is connected to an arm 303 pivoted on a stud 304 and a spring 305 urges the rod upward. However, the rod is normally prevented from moving upward by a lever 306 which engages a pin on the arm 303. A spring 307 normally holds the lever 306 in the depressed position shown in Fig. 5 and by full lines in Fig. 14. It will be noted that the arm 91 to which the elevating platform 90 is connected, carries a pin 308 which engages a slot in a link 309. The link is connected to an arm 310 which is fixed to the lever 306. Thus, when the arm 91 moves downward to withdraw an egg from the egg magazine, the pin 308, after taking up the lost motion in the link 309 oscillates the arm 310 and thereby swings the lever 306 upward. When the arm 303 is thus released, it will lift the feeler button 302. The latter is alined with an opening 302a (Fig. 2) in the casing 88 and the bottom plate 52 of the magazine, and will enter the opening 38 immediately back of the platform 90, provided there is no egg above the button. If, however, there is an egg in said opening, the button 302 will be held in depressed position.

Pivotally connected with the lever 306 is a hook 311 adapted to engage a pin 312 on one arm 313 of a lever 313a fulcrumed on a stud 314. The arm 303 is provided with a cam surface 315 upon which a pin 316 on the hook 311 is adapted to slide. A spring 317 holds the pin 316 in engagement with the cam 315 and when the parts are in the position illustrated in Fig. 5, the hook 311 will be held by the cam out of engagement with the pin 312 and the hook will slide idly up and down as the lever 306 is oscillated. If, however, there should be no egg in the opening above the button 302, the latter will be raised to the position shown by broken lines in Fig. 14 and the cam 315 will be turned to such position that the hook will catch the pin 312 and when it is lifted by the lever 306, it will raise the lever arm 313 upward with the arm 306. In this raised position, the arm 313 is locked by a spring pressed latch 318. The two positions of the arm 313 are shown in Figs. 14 and 5 respectively. It will be observed that the latch 318 is formed with two shoulders, the lower one of which is normally engaged by the lever 313 when there are eggs in the magazine while the upper shoulder is engaged by the lever when the eggs in the magazine are exhausted.

The lever 313a extends transversely adjacent the link 272 which controls the clutch and, when in the position shown in Fig. 5, locks the link 272 in depressed position by engaging a pin 319 projecting from the link. This will prevent operation of the machine after the eggs in the magazine are exhausted, or when there is no magazine in position.

An annunciator is operated when the magazine has been exhausted. A switch lever 320 is journaled on the plate 100 and has a projection 321 which lies in the path of a pin 322 on the hook 311. Under normal operation, the pin 322 clears the projection 321, but when the cam 315 is turned so as to permit the hook 311 to swing inward to the broken line position shown in Fig. 14, the pin 322 will engage the projection 321 and oscillate the switch lever 320. A switch blade 323 secured to but insulated from the lever 320, is thereby swung between a pair of contact fingers 324, closing a circuit to the annunciator 326 (Fig. 5a). The closing of the circuit is momentary, because when the hook 311 returns, a spring 325 acting on the switch lever 320 will immediately withdraw the blade 323 from the contact members 324.

*Magazine unlocking mechanism*

When the lever 313a is raised to locking position certain magazine-unlocking mechanism is actuated for releasing the egg magazine from the shaft 64, but this release is not actually accomplished until the cam 96 has completed a full turn, hence the magazine cannot be automatically unlocked until the last egg has been withdrawn and delivered to the bucket conveyor.

The magazine-unlocking mechanism includes a depending arm 330 (Fig. 14) which is pivotally connected to the lever 313a on the opposite side of the fulcrum 314 from the arm 313. This depending arm is connected by a link 331 to a crank arm 332 upon a shaft 333. A second crank arm 334 (Fig. 3) secured to the shaft 333 bears against the lower end of the rod 76 which operates the latch 73, and the spring 74 normally presses the crank arm 334 downward so that the crank arm 332 bears against a stop 333. The latter may conveniently form the pivot of the dog 251 (Fig. 15) and lever 282 (Fig. 16).

The lower end of the depending arm 330 lies in the plane of rotation of the pin 285 carried by the cam 96, but is normally held clear of said pin as shown in Fig. 14. When the lever 313a is tilted to the locking position shown in Fig. 5 the arm 330 is lowered. This necessarily takes place after the clutch has been connected and the cam 96 has made a partial rotation. At the end of said rotation just as the clutch lever 250 is about to strike the dog 251 which is being held down by engagement of the lever 313a with pin 319, the pin 285 strikes the end of the arm 330, thereby turning the shaft 333, lifting the rod 76 and releasing the latch 73 from the groove 75, so that the empty magazine may be lifted off the machine to be replaced with a filled one.

When the egg magazine is removed a resetting mechanism is actuated which, upon replacing the magazine, will unlatch lever 313a and restore the parts to normal operating position. This resetting mechanism comprises a bell crank lever 336, one arm of which has a pin 337 pivotally connected thereto while the other arm carries a spring pressed trip lever 338. A spring 339 is connected to the lever 336 and normally presses the pin 337 upward. The latter is guided through the bracket 300 and is pressed by the spring against the bottom of the plate 52 of the egg magazine. When the magazine is removed from the machine the pin 337 and the lever 336 are permitted to move to the position in Fig. 5 and during such movement the trip lever 338 snaps past a tooth 340 on the latch 318. When a magazine is positioned in the machine the pin 337 is depressed causing the trip lever 338 to strike the tooth 340, and because the trip lever is held by its spring against a stop 338a it cannot snap past the tooth 340 but will cause the latch 318 to oscillate and permit the arm 313 to drop from the position shown in Fig. 5 to that shown in Fig. 14. A spring 341 connecting the latch 318 and arm 313 assists in drawing the latter to lowered position and in holding the parts in the position shown in Fig. 14.

Means are provided whereby an authorized person may manually operate the arm 313a to unlock the magazine. As shown in Figs. 5 and 6, a bell crank lever 343 is fulcrumed on an extension of the bracket 80. One arm of the bell crank is adapted to swing across the path of the free end 344 of the lever 313a. The other arm is forked to engage a pin 345 on a crank arm 346. The latter is secured to the shaft 347 which is fixed to the barrel of a lock 348. By means of a key 349 inserted in the lock the barrel may be turned swinging the bell crank lever against the tension of a spring 350 into such position as to depress the end 344 of the lever 313a.

As explained above, if the machine is being operated to withdraw an egg at the time the lever 313a is lowered, the withdrawal of the egg will be completed before the magazine is unlocked. If the cam 96 should happen to be standing idle at the time the key 349 is turned the latch which holds the magazine on the machine will be released at once, because the lower end of the depending arm 330 is formed with an inclined face which, on striking the pin 285, causes said arm to be wedged over sufficiently to turn the shaft 333 and withdraw the latch 73 from locking engagement with the magazine.

Although the operations of the various parts of the machine have been described above in connection with the detailed descriptions of the various parts the following summary of operations may be found helpful:

Operation of machine

To load an egg magazine a key is inserted in the slot 48 and the lock 47 is opened to release the lid 41 so that it may be turned to swing the openings 42 into registry with the openings 36 in the top plate 35. Because the magazine is in the form of an open cage it may be readily loaded by inserting a finger between rods and under the eggs as they are fed in through the openings 36. When the magazine is loaded the lid is turned so as to stagger the openings 42 with respect to the openings 36 and thus prevent withdrawal of the eggs out of the top of the magazine, and in this position, the lid is held by the spring lock.

The magazine is positioned in the machine by fitting it upon the shaft 64 and turning it so that the lug 87 enters the notch 86 in the bottom locking plate 52. This brings the single opening or discharge port 54, of the plate 52, into registry with the withdrawing platform 90. The magazine is locked fast to the shaft 64 by the latch 73 and is keyed to the shaft by the pin 83 which enters one of the openings in the flange member 78. At the same time the pin 55 is withdrawn by engagement of arm 66 with the shaft 64, permitting the main body of the magazine to turn with the shaft relative to the bottom plate 52.

When positioned in the machine the discharge port 54 in the plate 52 occupies a position midway between two openings 38, and the top of the delivery platform 90 which enters the discharge port 54, lies flush with the bottom of the disk 37. When in response to an order the cam 96 is connected to power, the magazine is turned sufficiently to bring an opening 38 into alinement with the discharge port so as to permit the withdrawal of an egg and thereafter the magazine is turned further to move the opening 38 out of register with the discharge port.

Four steps in the withdrawal of an egg from the magazine are illustrated diagrammatically in Fig. 17. In the first position, A, the platform is shown as occupying a normal intermediate position between two columns of eggs. The first operation of the ratchet wheel 84 under control of cam groove 165 turns the magazine sufficiently to center a column of eggs directly over the platform, as shown in position B. While the ratchet pawl 168 is returning for a second stroke the platform 90 is lowered to the position C and the egg column above the platform moves down therewith. On the next movement of the ratchet wheel 84 the magazine moves to the position D, and the egg E' immediately above the egg E, which latter rests on the platform, will roll upon the surface of the egg E from the position C to the position D. Owing to this rolling movement there is a gentle lowering of the eggs in the column from which the withdrawal is made and danger of breaking the eggs is avoided. During movement of the magazine from the position C to D the annular recess 39 in the disk 37 provides clearance for the egg E. After the magazine has reached the position D it remains stationary while the cam is completing the balance of its rotation and during this interval the platform drops sufficiently for the egg E to clear the plate 52. The fingers 106 then eject the egg into one of the cups 131 of the bucket conveyor and, thereafter, the platform rises again to the position A.

The bucket conveyor carries the egg slowly down into the boiler and out again and the fingers 132 then eject the egg from the cup upon the annular conveyor which delivers the egg eventually to the delivery box. Only one egg at a time is delivered into the delivery box and hence the annular conveyor serves as a reservoir for undelivered orders of boiled eggs.

At an order station which may be remote from the machine a suitable token delivery device is provided which is illustrated diagrammatically at 360 in Fig. 5a. When a customer places an order for an egg and pays for it, the cashier receiving the order touches a key 361 which issues a token to the customer, registers the sale on a counter 362, and closes the switch 363. The switch controls the circuit of the ordering solenoid 260 and thus on closing the switch the escapement 265 (Fig. 15) is operated, permitting the ratchet wheel 266 to move through an angle of one tooth spacing, thereby correspondingly withdrawing the pin 274 from the lever 269. If a number of eggs are ordered at a time the cashier depresses the key 361 once for each egg ordered and the pin 274 is moved away from the lever 269 a corresponding number of steps. When the lever 269 is thus released the dog 251 is raised by the spring 273, permitting the clutch to connect the cam 96 and associated parts to follow it. At each turn of the cam the pin 285 thereon strikes the arm 284 (Fig. 16), causing the wheel 266 to return through an angle of one tooth spacing. The cam 96 will continue to rotate until the pin 274 returns to normal position and lowers the dog 251 into the path of the clutch lever 250, thus disconnecting the cam 96 from power.

At each turn of the cam 96 the ratchet wheel 275 is also turned in the same direction as is the wheel 266, so that when a predetermined number of undelivered orders have been accumulated in the machine the pin 289 will strike the lever 269 and cause the dog 251 to disconnect the cam from power. However, at each opening of the delivery box door the escapement 277 of the wheel 275 is operated to permit the lever to turn in the opposite direction through an angle of one tooth spacing, thus withdrawing the pin 289 from the lever 269. The ratchet wheel 275 thus serves to prevent overloading of the machine with undelivered orders. In the meantime the wheel 266 may accumulate further orders to be filled as soon as the wheel 275 is operated to release the dog 251.

The customer obtains his order from the machine by depositing his token in the token receiver to unlock the door of the delivery box after which he may open the door, but he can obtain only one egg at a time from the box, because the bar 240 prevents a succeeding egg from entering the box until the door is closed. Therefore he must deposit a token for each egg he obtains. Furthermore, if there is no egg in the box the token cannot be inserted by the customer.

At each withdrawal of an egg from the magazine the button 302 feels out the preceding opening 38 to determine whether there is an egg therein to fill the next order. When the button does not encounter an egg the lever 313a is operated to disconnect the cam 96 from power as soon as it has completed its instant rotation, thus, stopping further operation of the egg withdrawing mechanism. At the same time the switch 323 is closed to operate the annunciator 326 (Fig. 5a) and simultaneously the latch 73 is operated to release the magazine from the machine as soon as the cam 96 completes its instant rotation.

While I have described a preferred embodiment of my invention it will be understood that my invention is not limited to this particular embodiment nor to the particular details of construction described, but I reserve the right to make such changes of construction and arrangements of parts as fall within the spirit and scope of the invention as more particularly pointed out in the claims.

I claim:

1. In a food preparing and delivering machine, a magazine for raw food, a boiler, a reservoir for cooked food, mechanism for withdrawing portions of food from the magazine, means including a continuous running conveyor for passing said portions through the boiler and into the reservoir, remote-controlled means for controlling operation of said mechanism without interrupting said conveyor, and token-controlled means for providing access to the food in the reservoir.

2. In an egg boiling machine, a boiler, means for passing eggs therethrough, a reservoir, a conveyor passing therethrough, means for transferring eggs to the conveyor as they issue from the boiler, and spacer devices in the reservoir adapted to be successively operated by the eggs in the conveyor, each of said spacer devices acting while engaged by one egg to bar the advance of the next succeeding egg.

3. In an egg boiling machine, a boiler, a delivery box, means for passing eggs through the boiler and conveying them to the delivery box, and means for preventing more than a predetermined number of eggs at a time from entering the delivery box.

4. In an egg boiling machine, a boiler, a delivery box, means for passing eggs through the boiler and conveying them to the delivery box, token-controlled means for opening the box, and means for preventing operation of said token-controlled means when there is no egg in the box.

5. In an egg boiling machine, a boiler, a delivery box, conveyor means for passing eggs through the boiler and into the box, token-controlled means for opening the box, and means for preventing eggs on the conveyor means from entering the box when the latter is open.

6. An egg delivery mechanism, comprising a casing, a delivery box at one end thereof, a conveyor running continuously through the casing and the box and adapted to deliver eggs into the box, and means for lifting each egg off the conveyor as it enters the box.

7. In an egg boiling machine, an egg magazine, a boiler, a delivery box, conveyor means leading through the boiler and to the delivery box, mechanism for withdrawing eggs from the magazine and delivering them to the conveyor means, and means for interrupting operation of the egg withdrawing mechanism when a predetermined number of eggs have accumulated on the conveyor means.

8. A magazine for eggs comprising a body portion formed with admission ports and discharge ports, a plate movable relatively to the body portion and having openings therein adapted to register with the admission ports, means for locking said plate out of registry with the admission ports, valve means operable to open and close the discharge ports successively, and a lock normally holding the valve means in closed position.

9. A magazine for eggs comprising a body portion formed with admission ports and discharge ports, a valve plate for controlling the admission ports, said plate being movable relatively to the body portion and having openings adapted to register with the admission ports, means for locking said valve plate out of registry with the admission ports, a second valve plate having a single discharge opening and movable relatively to the body portion to open the discharge ports one at a time, and means for locking said second valve plate with the opening thereof intermediate between two discharge ports.

10. A magazine for eggs comprising a base plate provided with discharge ports, means carried by the plate for supporting eggs in columns over said ports respectively, a valve plate formed with an opening and movable relatively to the base plate to bring said opening successively into engagement with said discharge ports, means for locking the valve plate with said opening out of registry with the discharge ports, a lid adapted to close the top of said columns, and means for locking said lid in closed position.

11. In combination, a portable egg magazine having a discharge port and valve for controlling said port, a machine for withdrawing eggs from the magazine through the discharge port and providing a mounting for said magazine, a lock normally locking the valve in closed position, and means controlled by said machine for automatically unlocking the valve when the magazine is seated on said mounting.

12. In combination, a portable egg magazine having a discharge port, a valve carried by the magazine for controlling said port, a lock normally locking the valve in closed position, a support for said magazine, and means actuated by said support for automatically unlocking the valve when the magazine is mounted thereon.

13. In combination, a portable egg magazine having a discharge port, a valve carried by the magazine and controlling said port, a lock normally securing the valve in closed position, a machine providing a mounting for said magazine and including means for withdrawing eggs from the magazine through the discharge port, a latch for locking the magazine on the mounting, means actuated by said mounting for automatically unlocking the valve when the magazine is mounted on the machine and means for automatically releasing the latch, when the eggs have all been withdrawn from the magazine.

14. In combination, a portable egg magazine having a discharge port, a valve carried by the magazine and controlling said port, a lock for said valve, a machine providing a mounting for said magazine and including means for withdrawing eggs from the magazine through the discharge port, a latch for locking the magazine on the mounting, means actuated by said mounting for automatically unlocking the valve when the magazine is seated on the mounting, means for automatically releasing the latch when the eggs have all been withdrawn from the magazine, and means for automatically locking said valve in closed position when the magazine is removed from said mounting.

15. In combination, a portable egg magazine, a machine providing a mounting for said magazine and including means for withdrawing eggs from said magazine, a latch adapted to lock the magazine on the mounting, means for unlocking said latch, and means for preventing unlocking of said latch while an egg is being withdrawn from the magazine.

16. In combination, a portable egg magazine having a discharge port, a valve carried by the magazine and controlling said port, a lock normally securing the valve in closed position, a machine providing a mounting for said magazine and including means for withdrawing eggs from the magazine through the discharge port, a latch for locking the magazine on the mounting, means actuated by said mounting for automatically unlocking the valve when the magazine is mounted on the machine, means for automatically releasing the latch when the eggs have all been withdrawn from the machine, and means for preventing operation of the egg withdrawing means when the eggs in the magazine have been exhausted.

17. In combination, an egg magazine including means for supporting eggs in an annular series of columns and having a discharge port under each column, a valve plate mounted on the bottom of the magazine and having a discharge opening normally out of registry with any of said ports, means for intermittently rotating the magazine with respect to the valve plate by steps of half the angular spacing of said ports whereby successive ports will be alternately opened and closed by the valve plate, egg-withdrawing mechanism operating to permit partial withdrawal of an egg from the magazine as each port is opened, but retaining the egg in the valve opening during the succeeding step of the magazine whereby a superincumbent egg in the magazine will descend upon the valve plate in rolling contact with the egg retained in the valve opening, and means operating thereafter to withdraw the egg retained in the valve opening.

18. In the method of withdrawing an egg from the bottom of a column of eggs, the steps which consist in lowering the column to an extent less than the diameter of one of the eggs, causing relative lateral movement of the egg at the bottom of the column with respect to the column, and permitting the column to descend through the balance of said egg diameter in engagement with the bottom egg as a roller bearing.

19. In a food preparing machine, a food magazine, a boiler, an endless conveyor running through the boiler, normally inactive mechanism for withdrawing a food portion from the magazine and introducing it into the conveyor, an ejector for forcing the food out of the conveyor after it has passed through the boiler, means for delivering the ejected food portion to a delivery station, means for simultaneously initiating operation of said mechanism and issuing a token, and means operable by said token at said station to provide access to said food portion.

20. In an egg boiling machine, a boiler, an endless conveyor, a cup carried thereby into and out of the boiler, means for introducing an egg into the cup as it enters the boiler, and means for ejecting the egg from the cup as it emerges from the boiler.

21. In an egg boiling machine, a boiler, an endless conveyor, an open-mouthed cup fixed to the conveyor and carried thereby into and out of the boiler, means for introducing an egg into the cup as it enters the boiler, and means for ejecting the egg from the cup as it emerges from the boiler, said boiler including a wall adapted to close the mouth of the cup as the latter passes through the boiler.

22. In an egg boiling machine, a boiler, an endless bucket conveyor therein with a portion of the conveyor projecting out of the boiler, feeding means timed to the operation of the conveyor for introducing an egg into each bucket as it enters the boiler, said feeding means being normally inactive, and means under control of an operator for actuating the feeding means.

23. In an egg boiling machine, a boiler, an endless bucket conveyor therein with a portion of the conveyor projecting out of the boiler, feeding means timed to the operation of the conveyor for introducing an egg into each bucket as it enters the boiler, said feeding means being normally inactive, means under control of an operator for actuating the feeding means, and means for ejecting the contents of each bucket as it emerges from the boiler.

HARRY RUSSELL BRAND.